US009171386B2

(12) United States Patent
Jain et al.

(10) Patent No.: US 9,171,386 B2
(45) Date of Patent: Oct. 27, 2015

(54) CACHING COVERAGE VALUES FOR RENDERING TEXT USING ANTI-ALIASING TECHNIQUES

(75) Inventors: Megha Jain, Seattle, WA (US); Miles M. Cohen, Seattle, WA (US); Robert A. Brown, Redmond, WA (US); Worachai Chaoweeraprasit, Bellevue, WA (US); Andrew M. Precious, Duvall, WA (US); Kanwal VedBrat, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 980 days.

(21) Appl. No.: 13/270,926

(22) Filed: Oct. 11, 2011

(65) Prior Publication Data
US 2013/0088505 A1 Apr. 11, 2013

(51) Int. Cl.
G06T 11/20 (2006.01)
G09G 5/02 (2006.01)
G09G 5/28 (2006.01)

(52) U.S. Cl.
CPC .............. *G06T 11/203* (2013.01); *G09G 5/026* (2013.01); *G09G 5/28* (2013.01); *G06T 2200/12* (2013.01); *G09G 2320/0276* (2013.01); *G09G 2340/0457* (2013.01); *G09G 2340/10* (2013.01); *G09G 2360/121* (2013.01)

(58) Field of Classification Search
CPC ..................................................... G06T 11/203
See application file for complete search history.

(56) References Cited

U.S. PATENT DOCUMENTS

| 6,933,947 | B2 | 8/2005 | Platt |
| 6,985,157 | B2 | 1/2006 | Platt |
| 7,046,250 | B1 | 5/2006 | Slott |
| 7,142,220 | B2 | 11/2006 | Platt |

(Continued)

FOREIGN PATENT DOCUMENTS

| CN | 1514344 A | 7/2004 |
| CN | 101171619 A | 4/2008 |

(Continued)

OTHER PUBLICATIONS pubsub beta: "ClearTypeHint"; Published Jan. 14, 2010; 7 pages http://pubsub.com/ClearTypeHint_Windows-text-rendering-ClearType-7TW70qY9njr,cR6z28SMLyDE.

(Continued)

*Primary Examiner* — Zhengxi Liu
(74) *Attorney, Agent, or Firm* — Sunah Lee; Judy Yee; Micky Minhas

(57) ABSTRACT

Techniques for calculating sub-pixel coverage values for text to be displayed, so as to enable caching of the sub-pixel coverage values. The sub-pixel coverage values may enable a linear combination of color information for the text with color information for one or more other, overlapping display elements for calculating composite color values to be used in controlling a display. Such composite color values to be used in controlling sub-pixels of a display may be calculated, in some embodiments, without performing a gamma correction process. Also described are techniques for retrieving cached sub-pixel coverage values and combining the values with color information for text and for other, overlapping display elements to calculate composite color values for sub-pixels of a display. At least one graphics processing unit (GPU) may be configured to perform operations using the sub-pixel coverage information and to calculate the composite color values for the sub-pixels.

20 Claims, 8 Drawing Sheets

(56) References Cited

U.S. PATENT DOCUMENTS

| | | | |
|---|---|---|---|
| 7,623,130 | B1 | 11/2009 | Burkey |
| 2004/0151398 | A1* | 8/2004 | Betrisey et al. ............... 382/260 |
| 2005/0212799 | A1* | 9/2005 | Liao et al. .................... 345/420 |
| 2005/0253865 | A1 | 11/2005 | Proteau |
| 2006/0114258 | A1 | 6/2006 | Stamm et al. |
| 2007/0216687 | A1 | 9/2007 | Kaasila et al. |
| 2008/0186325 | A1 | 8/2008 | Higgins et al. |
| 2010/0123721 | A1 | 5/2010 | Wong et al. |
| 2011/0285747 | A1* | 11/2011 | Kilgard ......................... 345/613 |
| 2012/0026216 | A1* | 2/2012 | Brown Elliott et al. ...... 345/694 |

FOREIGN PATENT DOCUMENTS

| | | |
|---|---|---|
| CN | 101268700 A | 9/2008 |
| CN | 101467140 A | 6/2009 |
| KR | 1020100127002 A | 12/2010 |

OTHER PUBLICATIONS

Silverlight 3: The Official Microsoft Silverlight Site: "What's New in Silverlight 3"; 2009; 3 pages; http://www.silverlight.net/getstarted/silverlight3/.

Microsoft Typography: "What is ClearType?"; Last updated Jan. 16, 2002; 2 pages; http://www.microsoft.com/typography/WhatIsClearType.mspx.

"Glyph Keeper" Last updated Feb. 6, 2007; 9 pages; http://kirill-kryukov.com/glyph-keeper/manual.shtml.

Wikka: "Rendering text with a font on the server"; Last updated Jan. 28, 2008; 6 pages; http://wikkawiki.org/FontActionInfo.

"International Search Report", Mail Date: Mar. 4, 2013, Application No. PCT/US2012/059626, Filed date: Oct. 11, 2012, pp. -10.

"First Office Action and Search Report Issued in Chinese Patent Application No. 201210383385.5", Mailed Date: Sep. 10, 2014, 15 Pages.

"Supplementary Search Report Issued in European Patent Application No. 12840825.9", Mailed Date: May 15, 2015, 5 Pages.

Loops, et al., "Chapter 25. Rendering Vector Art on the GPU", Published on: 2008, 18 pages, Available at: https://developer.nvidia.com/gpugems/GPUGems3/gpugems3_ch25.html.

Young, Peter, "Coverage Sampled Antialiasing", Published on: Oct. 30, 2006, 12 pages, Available at: http://developer.download.nvidia.conn/SDK/9.5/Samples/DEMOS/Direct3D9/src/CSAATutorial/docs/CSAATutorial.pdf.

"Second Office Action and Search Report Issued in Chinese Patent Application No. 201210383385.5", Mailed Date: May 21, 2015, 12 Pages.

* cited by examiner

CACHING COVERAGE VALUES FOR RENDERING TEXT USING ANTI-ALIASING TECHNIQUES

BACKGROUND

Computing devices can display information to human users in the form of text. Text is made up of strings of characters. For English text, the characters are in the form of letters and punctuation marks. Information presented in other languages may use other characters. Regardless of how the specific characters are used to represent text, a computing device may be configured with a utility that can receive input defining the text to be rendered on a display of the computer and then generate the appropriate control signals to the display so that the text is appropriately displayed.

Input defining the text to be rendered on a display can be in any suitable form, including using definitions of glyphs. A glyph is an element of text, such as all or a portion of a character. Where characters are letters and punctuation marks, a glyph may be all or a portion of a letter or punctuation mark like lines and dots. Definitions of glyphs describe the shape of the glyph, and can be in any suitable format and used in any suitable way to generate appropriate control signals to the display.

A rendering process to generate controls signals for appropriate display of text may include multiple steps. Some of these steps may be directed to making text more pleasing for human users to view. When viewing content on a computer display, humans tend to be more sensitive to how text is presented than they are to the presentation of other graphical objects. Presenting text via a computer display in a way that humans will find comfortable to view therefore requires steps different from those used for presenting images. One example of such extra steps is the handling of edges of glyphs of text.

In particular, many computer users do not like viewing or find it difficult to view text on a display when pixel values of the display are set to give glyphs hard, high-contrast edges because this can give the edges of text a blocky and jagged (or "aliased") appearance. To provide a more pleasing presentation, "anti-aliasing" techniques are used. Anti-aliasing techniques select which pixels of the display are used to represent the glyph and the areas around the glyph and set an intensity for each such pixel to smooth edges of the glyphs and make the glyphs more pleasing to view.

When text is to be displayed on a display, the text may be displayed together with other display elements. For example, text may be displayed overlapping with background or foreground graphics. To display the text and a graphic as overlapping, a computing device determines a composite color to be emitted by individual pixels of the display that will create an effect of the text overlapping the graphic. To determine the composite color, calculations are performed using color information for the text and color information for the graphic. The color information for the text and the graphic may be contained in color values for each of the text and the graphic that correspond to pixels of the display. For example, where the color information for the text indicates a particular pixel should be red, and the color information for the graphic indicates the particular pixel should be blue, an overlapping effect may be created by identifying the composite color value for the pixel as purple.

To facilitate combining the color information, each color value for the text and overlapping display elements may be associated with "coverage" information, represented by coverage values (also called "alpha" values). When calculating a composite color value by combining color values for overlapping display elements, the coverage values for each display element are used to weight, on a pixel by pixel basis, the respective contributions of color values toward the composite color values. In particular, the coverage values can be used to introduce a transparency effect by weighting color values for one display element less than color values for another display element. For example, for an individual pixel, when the weighting from the coverage values makes a composite color value more similar to the color of a graphic, text that is to be displayed as being on top of the underlying graphic may appear on the display to be transparent or more transparent than if the composite color value was instead more similar to the text color.

Coverage values may also be used in anti-aliasing techniques for softening the edges of text and make the edges appear to blend smoothly with overlapping display elements. To make the edges appear to blend smoothly, when determining a composite color value for a pixel, a coverage value for the text for that pixel may be set to create a transparency effect. For example, coverage values for text can be set to create a more opaque effect for pixels in the middle of a glyph or close to the edge of a glyph and more transparent effect away from the edge of the glyph, which can create the blending effect. In particular, coverage values for text may be set per pixel of the display based on a proportion of the pixel that falls within a display area of any character of the text. For a pixel that falls completely within the area of a character, the coverage value may be specified to be 100%, such that the text is not transparent at that pixel (i.e., the color of the pixel will be more similar to the text color). Likewise, for a pixel that is entirely outside the area of any character of the text, the coverage value may be specified to be 0%, such that the text is fully transparent at that pixel and the pixel will not display any information related to the text. Pixels along edges of the text, which could be partially within and partially outside the area of characters of the text, would have a coverage value for the text between 0% and 100% based on the amount of any character that overlaps the pixel. Therefore, the contribution of the text color to the composite color value for the pixel will be weighted according to the proportion of the pixel that falls within the display area of a character of the text. This allows the text to be displayed with a smoothing effect that makes the text appear to blend into the background along the edges, rather than having a hard, high-contrast edge with the background. Coverage values set in this way can be normalized to be numbers between 0 and 1.

Multiple anti-aliasing techniques are known. One anti-aliasing technique for shading the edges of glyphs is often referred to as "grayscale" shading. Using grayscale shading, a single coverage value for the text is set for a pixel as a whole using the techniques previously described.

Another technique is known as sub-pixel anti-aliasing, or alternatively as sub-pixel coverage. This approach takes advantage of a characteristic of many computer displays that can present information in color. The pixels of many types of displays each include multiple sub-pixels that operate together to project light from the pixel. Each sub-pixel of a pixel emits light of a different color, such as red, green, or blue. By controlling the sub-pixels, both the intensity and color of light emitted from the pixel can be controlled.

In sub-pixel anti-aliasing techniques, instead of controlling the sub-pixels strictly based on the desired color and intensity of light to be emitted by an entire pixel, values to control each sub-pixel individually are set to create a smoothing effect when displaying a glyph. In particular, for sub-pixel anti-aliasing, coverage values are set separately for each sub-pixel of a pixel, rather than for an entire pixel as in grayscale anti-aliasing. While in grayscale anti-aliasing the coverage value for text for a pixel was set in proportion to the amount of the pixel that falls within a display area of a character, in sub-pixel anti-aliasing the coverage value may be set in proportion to the amount of each sub-pixel. The coverage values for individual sub-pixels can be used when setting composite control values for controlling each of the sub-pixels to emit light with certain intensity. In particular, as discussed above, the color information for the text can be combined with the sub-pixel coverage values for the text and color information for overlapping display elements to determine the composite control values for sub-pixels. As the sub-pixels of a display have a finer resolution than the full pixels, setting a coverage value for each sub-pixel, a finer grain of smoothing can be achieved than is possible using grayscale anti-aliasing and the visual appearance of text may be superior to that which can be achieved using grayscale anti-aliasing. MICROSOFT® CLEARTYPE® text, available from the Microsoft Corporation of Redmond, Wash., is an example of a smoothing technique that uses sub-pixel anti-aliasing.

As discussed above, coverage values can be used to create such transparency and smoothing effects because of the impact coverage values have on calculations to determine composite color values to be presented by a pixel of a display. These calculations on color values are performed when multiple display elements (such as text and a graphic) are to be displayed so as to appear overlapping, when the coverage values for the text are used to modify color values for the text. Though, a complexity arises when combining color information for multiple display elements. Because most displays do not respond linearly, mere linear interpolation of modified color values (as modified by coverage values) for multiple display elements will yield composite colors that do not appear to the human eye to be the superposition of the text and the graphic. Consequently, if modified color values for text and a graphic were combined by linear interpolation, the resulting display would not appear to a human to be correct. To avoid this result, it is known to apply a technique called "gamma correction" to alter the combination of the modified color values such that the composite color appears to a human viewer like the intended superposition. In gamma correction, the composite color values produced through linear interpolation are modified by a "gamma value" that is associated with the display that is to be used, such that the composite color values will appear correct.

SUMMARY

Applicants have recognized and appreciated that, by appropriate ordering of processing steps, a computing device may operate more quickly, with good display quality, when rendering text on a display. The steps may be ordered to facilitate caching of information that can be subsequently used in rendering text in different locations with respect to overlapping graphics. Fast and high quality presentation of text may further be facilitated by selection of information to cache and the manner in which to cache the information.

Accordingly, described herein are techniques for processing information regarding text to be displayed in such a manner as to enable caching of sub-pixel coverage values determined using sub-pixel anti-aliasing techniques. In some embodiments, techniques may yield sub-pixel coverage values for text that may be combined linearly with information regarding one or more overlapping display elements to determine composite color values of pixels and/or sub-pixels of a display. In these embodiments, as the sub-pixel coverage values, when retrieved from cache, can be combined linearly with information on overlapping display elements, rendering of the text together with the overlapping display elements may be performed more quickly and efficiently. The sub-pixel coverage values may be cached separate from color values for text. In some embodiments, color values may be partitioned from sub-pixel coverage values and stored in a separate data structure.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
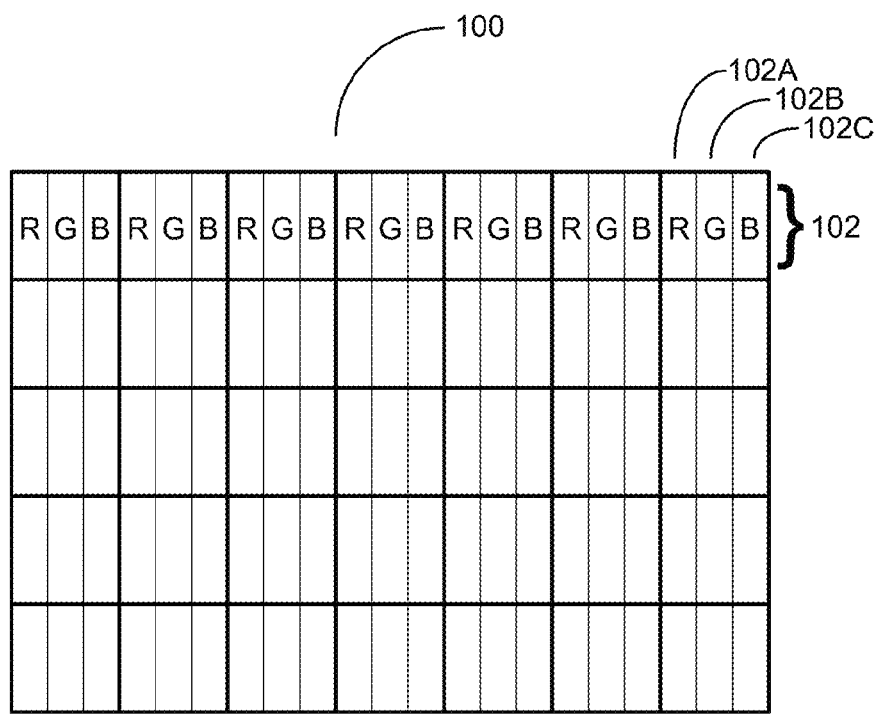
FIG. 1A is a block diagram of an exemplary display having sub-pixel color channels.

Applicants have recognized and appreciated that the processing steps required for display of text in a user interface slow down the interface, particular for interfaces that include animations or permit users to animate elements of the interface. Applicants have further recognized and appreciated, though, that an appropriate ordering of processing steps may enable caching of information relating to text and that this caching of information may expedite the rendering of text. In addition, Applicants have recognized and appreciated that, while conventional techniques for storing color values and coverage values for pixels stored values for a pixel associated together in a single data structure, the rendering of text may be expedited if sub-pixel color values and sub-pixel coverage values were separated into different data structures to be processed by a graphics processing unit.

More particularly, Applicants have recognized that user interfaces are becoming more interactive and more animated than previous interfaces and that this rise in the amount of animation presents particular difficulties for the rendering of text in a user interface. Rendering of text in a way that is pleasing for a viewer requires many processing steps, which include calculation of coverage values for text, combination of color information and coverage values for the text with color information for overlapping graphics, and gamma correction of the resulting composite color values. These processing steps can require a relatively long time to execute, which can cause time-delay problems when animation is incorporated into user interfaces. For example, user interfaces permit interactive animations such as zooming in on text or scroll or moving text relative to a background graphic. Using conventional rendering techniques, each time the text is to be re-rendered following an animation, the same processing steps must be carried out again to determine the composite color values for the new superposition of text and graphics. The processing steps can therefore make the interface respond to a user in a choppy or slow manner.

Applicants have further recognized and appreciated that the types of devices with which these animated interfaces are to be used are changing. Animated interfaces are popular in hand-held computers having touch-screen interfaces, like mobile phones and tablet computers. Such hand-held computers, though, have limited resources and relatively slow processors as compared to desktop or laptop personal computers. Performing the processing steps for text following an animation using such limited resources can slow further these animated interfaces.

Applicants have also recognized and appreciated that these processing steps must be repeated because, when the position of text relative to overlapping display elements changes, composite color values may change and the conventional rendering process requires that gamma correction be carried out on the new composite color values. Applicants have recognized and appreciated, though, that if the text information and information on other display elements could be combined without performing a gamma correction, the processing steps that must be performed following an animation could be streamlined. In particular, if the gamma correction could be eliminated, color information for text and other, overlapping display elements could be combined linearly following an animation. Such a linear combination could be performed quickly. Further, the text information, including sub-pixel coverage values, could be cached in advance and merely retrieved and combined with the information on overlapping display elements following an animation. Merely performing the combination could expedite rendering of an interface and make the interface more pleasing for users to view and operate.

Additionally, Applicants have recognized and appreciated that some conventional graphics processing units (GPUs) are specially configured to perform some rendering operations, including linear combinations of color information, and can perform these operations quickly. If GPUs could be configured to perform operations for the combination of color information for text and other, overlapping display elements, rendering operations following an animation may be further expedited. For example, if a GPU were programmed to operate on a data structure of cached sub-pixel coverage values and combine the cached sub-pixel coverage values with sub-pixel color information for text and for other, overlapping display elements to determine composite color values for sub-pixels, the rendering operations could be expedited and interfaces improved.

Accordingly, described herein are techniques for calculating coverage information regarding text to be rendered so as to enable caching of the coverage information. In some embodiments, processed coverage values for use with sub-pixel anti-aliasing techniques are calculated and cached. When the sub-pixel coverage values are cached for later use after processing, the sub-pixel coverage values may be placed in a main memory (e.g., system memory or video memory) of a computing device without the processed values being combined or associated with color information for the sub-pixels. The processed coverage values may, in some embodiments, enable a linear combination of color information for the text with color information for one or more other, overlapping display elements to calculate composite color values to be used in controlling a display. Such composite color values to be used in controlling sub-pixels of a display may be calculated, in some embodiments, without performing a gamma correction process.

Also described herein are techniques for retrieving cached sub-pixel coverage values and combining the sub-pixel coverage values with color information for text and other, overlapping display elements to calculate the composite color values for the sub-pixels. In some embodiments, at least one graphics processing unit (GPU) may be configured to perform operations using the sub-pixel coverage information and to calculate the composite color values for the sub-pixels. In some cases, the GPU(s) may be configured to calculate the composite color values for the sub-pixels based on sub-pixel color values for the text and sub-pixel coverage values for the text that are stored separately. For example, the sub-pixel color values (which may be control values for the red, green, and blue color channels for a pixel) may be stored in a different data structure than the sub-pixel coverage values. This may be the case where a GPU is natively adapted to process input information about a single pixel that is arranged in a single data structure with four fields/values for the pixel: three color values (red, green, and blue) and one coverage value for the pixel. In some embodiments, with sub-pixel coverage values, a GPU would process six values for a pixel: three sub-pixel color values (red, green, and blue) and three sub-pixel coverage values. The GPU(s) may efficiently and quickly process the input information when arranged in the four-value format. To place the data in the four-value format for efficient processing, in some embodiments the color values for a pixel are separated from the coverage values for a pixel and placed in different data structures. In some cases, the three color values may be placed in one four-value data structure and the three sub-pixel coverage values may be placed in a different four-value data structure. The GPU(s) may then be configured to process the information for a single pixel using two data structures, where conventionally GPUs process all information for a single pixel (color values and a coverage value) using a single data structure.

Various illustrative implementations of these techniques are described below. It should be appreciated, however, that embodiments are not limited to implementing any of these exemplary techniques discussed, as embodiments may be implemented in any suitable manner.

As discussed above, techniques described herein may be used in determining composite color values for controlling pixels and sub-pixels of a display when text is to be displayed. In some cases, the text may be displayed alone, and the sub-pixel coverage values may be used in modifying only color information for the text when calculating the composite color values. In other cases, however, the text may be displayed overlapping with one or more other display elements and the sub-pixel coverage values may be used when calculating composite color values based on color information for the text and for the other display element(s). Embodiments are not limited to calculating composite color values for text overlapping with any particular display element or type of display elements. In various embodiments, overlapping display elements may be one or more graphics that are to be displayed on top of the text or behind the text, or may be other text. For ease of description, in the examples below the sub-pixel coverage values are described as being used in calculating composite color values where the text is to overlap another display element, and the other, overlapping display element is described as a background graphic. It should be appreciated, however, that unless indicated otherwise, any of these exemplary techniques may be used with other types of overlapping display elements or where the text does not overlap any other display element.

The techniques described herein may be useful for quickly and efficiently displaying text when the relationship between text and an overlapping display element changes. Such a relationship may change when the text or the overlapping display element move relative to one another, including when text moves in a user interface. For example, the techniques used herein may be useful when text is scrolled over a background graphic. These techniques may also be used where a background graphic is moved relative to text, or when an image with which the text overlaps changes. For ease of description, examples below are given in the context of rendering text when the text moves relative to a background graphic. However, it should be appreciated that these techniques may be useful for rendering text for any reason, including responsive to any relative change or responsive to a request to display the text that is not associated with any change to the text.

Some embodiments may operate in connection with sub-pixel anti-aliasing techniques, such as the MICROSOFT® CLEARTYPE® sub-pixel anti-aliasing technique. Sub-pixel anti-aliasing techniques operate in connection with displays in which pixels of the display include multiple sub-pixel lighting components. Text rendering techniques as described herein may be used in connection with any sub-pixel anti-aliasing technique, including such techniques as are known in the art.

FIG. 1A illustrates, in block diagram form, an example of a display with which some sub-pixel anti-aliasing techniques may operate. The display 100 of FIG. 1A includes an array of 5×7 pixels, including pixel 102. Each of the pixels of display 100 includes three sub-pixel elements, each of which is arranged to generate a certain color of light. The first row of the display 100 is labeled in FIG. 1A with the color of light each sub-pixel is configured to generate: red (R), green (G), or blue (B). Pixel 102, for example, includes a red sub-pixel 102A, a green sub-pixel 102B, and a blue sub-pixel 102C.

Sub-pixels of a display can be controlled such that the pixel as a whole emits a certain color or intensity of light. For example, by controlling red, green, and blue sub-pixels to each emit light of a certain amount, purple light could be emitted from the pixel as a whole. Using grayscale anti-aliasing and other coverage techniques, a single coverage value is set for the pixel as a whole that is used to adjust color values for each of the sub-pixels. Using sub-pixel anti-aliasing techniques, however, each of the sub-pixels is instead assigned an individual coverage value, such that the light output by each sub-pixel can be controlled to create an effect using each sub-pixel. In particular, the sub-pixels may each be assigned a coverage value used in presenting a smoothing effect to create the appearance of a glyph blending with an overlapping background graphic. When the pixel is controlled as whole using color values adjusted using the sub-pixel coverage values, the sub-pixels will create the desired blending effect.

Figure 1B:
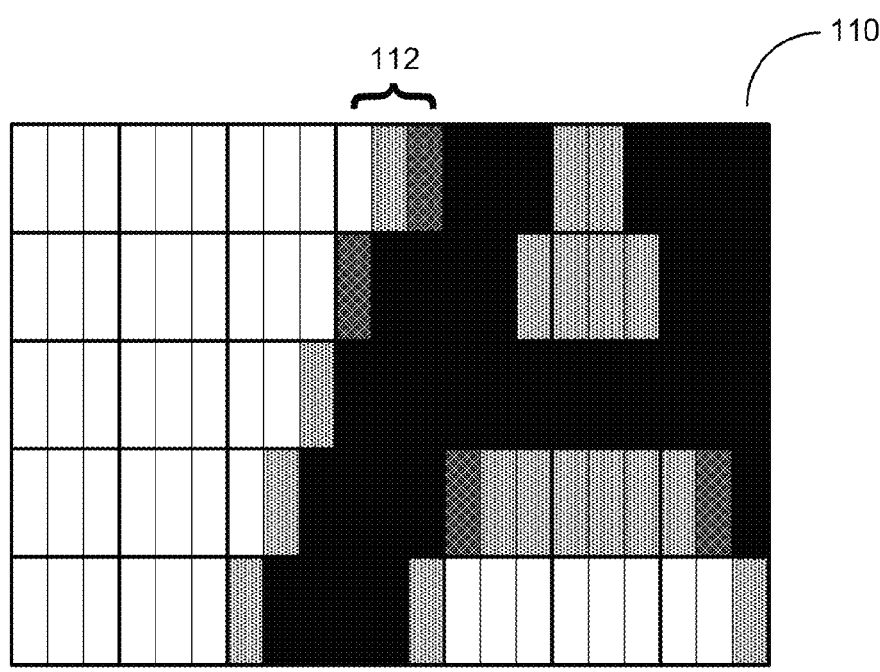
FIG. 1B is an example of a glyph drawn using sub-pixel anti-aliasing techniques.

FIG. 1B shows an example of creating a blending effect by assigning coverage values to individual sub-pixels. FIG. 1B shows a mapping 110 of coverage values that each correspond to sub-pixels of the display 100 of FIG. 1A. Mapping 110 shows how coverage values might be assigned when an 'A' glyph is to be displayed. When the glyph is to be displayed, the mapping 110 may be combined with other information to render the glyph for display on the display 100.

In the mapping 110, sub-pixels of the display are assigned different coverage values. As shown in the example of pixel 112, each of the sub-pixels of one pixel may be assigned different coverage values. The coverage values that are assigned to each sub-pixel may be used to control a transparency of the text color to be displayed using the sub-pixel so as to create the blending effect with a background graphic. As discussed above, coverage values for text may be used when determining a composite color based on text color and a color of a background graphic by weighting the text color in the calculation of the composite color. In the case of sub-pixel coverage values, where the sub-pixel emits light of a certain color (e.g., red, green, or blue light), the sub-pixel coverage values may be used together with the text color and the background graphic color to determine an amount of light or intensity of light emitted from each sub-pixel.

Through setting the amount/intensity of light using the sub-pixel coverage values, a blending effect can be presented for the text to be displayed in a display. This blending may soften the edges of text and make the text more pleasing for humans to view, as discussed above.

It should be appreciated that the number, colors, and ordering of sub-pixels presented in the example of FIGS. 1A and 1B are merely illustrative. Embodiments may operate with sub-pixels of other colors (e.g., yellow sub-pixels), with more or fewer sub-pixels per pixel (e.g., four sub-pixels), and/or may arrange pixels in any other way (e.g., a blue-red-green ordering instead of red-green-blue), as embodiments are not limited in these respects.

Further, embodiments are also not limited to operating with any particular type of graphical interface, display, or computing device. Techniques described herein can be used as part of rendering text for any graphical interface to be shown in any suitable display. Further, the graphical interface and display can be implemented with any suitable computing device. Examples of computing devices with which embodiments may operate include laptop or desktop personal computers, mobile phones, hand-held computers including smart phones and personal digital assistants (PDAs), tablet computers, and servers.

Figure 2:
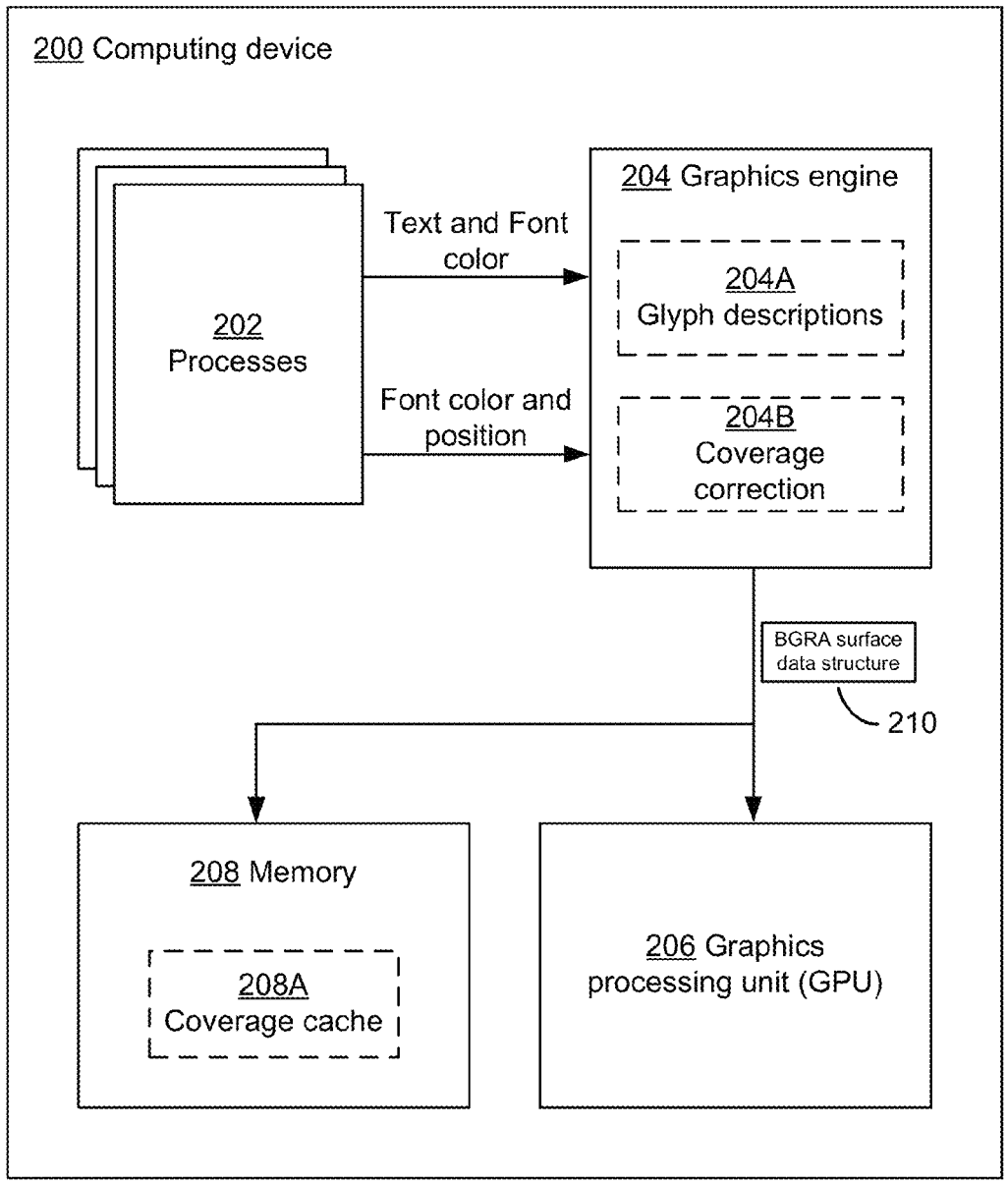
FIG. 2 is a block diagram of some components of a computing device with which some embodiments may operate.

An example of a computing device with which some embodiments may operate is illustrated in FIG. 2. The block diagram of FIG. 2 shows some components of exemplary computing device 200. As shown, computing device 200 includes one or more executing processes 202 (also more simply termed "processes" 202 herein), each of which may interact with a graphics engine 204 to request that content be displayed in a display. The content to be displayed may include text that can be rendered by the graphics engine 204 using anti-aliasing techniques. As part of rendering the content, including the text, for display on the display, the graphics engine 204 may interact with at least one graphics processing unit (GPU) 206 to perform some operations related to rendering, and may additionally store some information in a memory 208.

The processes 202 may be any suitable processes carrying out any type of processing or functionality, as embodiments are not limited in this respect. Examples of processes include those associated with application software, system software, and/or other types of software. The functionality of each process may include functionality for controlling and/or displaying at least a portion of a graphical user interface (GUI) that may be employed by a user to operate or prompt other functionality of the processes 202. The GUI may include text, in which cases displaying the GUI may include displaying text in the GUI. Embodiments are not limited to GUIs that display text in any suitable format and are not limited to text that exists in any suitable format. Where the text is English-language text, the text may include a combination of letters and punctuation marks. Where the text is in other languages, other characters of other forms may be used.

Where the GUI includes text, the GUI may in some cases also permit animation of the text. In response to such animations, the text may be adjusted on the display. Such adjustments may include changing a position or size of the text relative to other display elements of the interface, such as moving the text relative to a background graphic, moving a background graphic relative to the text, or changing the background, or any other suitable adjustment as discussed above. Displaying the GUI may therefore include updating the display of the GUI with, for example, text in a new position relative to other display elements.

To display or update the display of a GUI, the processes 202 may interact with the graphics engine 204. The graphics engine 204 may implement at least a portion of the functionality carried out by the computing device 200 for rendering graphics for a display. In some embodiments, the graphics engine 204 may operate as an anti-aliasing facility to determine sub-pixel coverage values related to text to be rendered for display. In some embodiments, the graphics engine 204 may additionally include functionality to produce a raster image of text to prepare text for display in a graphical interface. Such a raster image may be in any suitable format, including as a bitmap. Further, in some embodiments, the graphics engine 204 may combine information regarding text to be displayed with information regarding other display elements, such as background graphics, and prepare the combination for display on the display by, for example, determining composite color information to be used in controlling the display. In some embodiments, the graphics engine 204 may implement a portion of the MICROSOFT® Direct2d™ and/or DIRECTX® graphics libraries, each of which is available from the Microsoft Corporation of Redmond, Wash. The functionality of the graphics engine 204 may be carried out in any suitable manner. In some embodiments, the functionality of the graphics engine 204 may be performed entirely via instructions executed by at least one central processing unit (CPU) of the computing device 200. In other embodiments, at least a portion of the functionality may be performed via instructions executed by one or more GPUs 206. Where at least some functionality is performed using the GPU 206, the GPU 206 may be configured by the graphics engine 204 to carry out the functionality and/or configured to execute specific instructions.

Accordingly, to display and update a GUI for interacting with a user, a process 202 may interact with the graphics engine 204. Through interactions with the graphics engine 204, a process 202 may inform the graphics engine 204 of the content of the GUI that the process 202 wishes to display in a display. Information on a content of the GUI may include any suitable properties of display elements to be included in the GUI, including shapes, sizes, positions, and colors of the display elements. When the GUI is to be updated, such as in response to user input, any or all of the properties may be communicated again between the process 202 and the graphics engine 204. The information regarding the display elements may be communicated between the processes 202 and the graphics engine 204 in any suitable manner. For example, some embodiments may use one or more Application Programming Interface (API) function calls to exchange data between a process 202 and the graphics engine 204.

As mentioned above, techniques described herein may be used in rendering and displaying text for an interface to be shown on a display. Accordingly, in some embodiments, a process 202 may interact with the graphics engine 204 to request that text be displayed in a GUI and/or that a display of the text be updated. Any suitable text may be displayed in an interface in any suitable styling, as embodiments are not limited in this respect.

In accordance with techniques described herein, when a process 202 communicates to the graphics engine 204 a request that text be displayed on a display, the graphics engine 204 may determine how the text is to be displayed in the interface. Exemplary operations that may be carried out by the graphics engine 204 to determine how to display the text are discussed in detail below in connection with FIGS. 3-7. In short, however, the graphics engine 204 may, based on a data store 204A of glyph descriptions, identify shapes that correspond to the text to be displayed on the display. As discussed above, text may include any suitable combination of characters, and glyphs may be all or a portion of a character. The computing device may include a data store 204A of glyph description that instruct how to draw the shape of a glyph, such as the lines or dots of a glyph that will be used in drawing a character. The shape of a glyph may be identified based on any suitable description, including an image of a glyph or a mathematical description of a shape of a glyph, as embodiments are not limited in this respect.

From the descriptions of the data store 204A, the graphics engine 204 may determine a mapping of glyph shapes to the pixels and sub-pixels of a display that will be used to display the text on the display. An example of such a mapping was discussed above and illustrated in FIG. 1B. The graphics engine 204 may then calculate sub-pixel coverage values, using a sub-pixel anti-aliasing technique, to be used in displaying the text.

In some embodiments, when the graphics engine 204 calculates the sub-pixel coverage values for the text, the sub-pixel coverage values may be calculated in such a manner that the values may be cached and subsequently retrieved from the cache when the text is to be displayed or updated in the GUI. For example, in some embodiments, sub-pixel coverage values calculated for the text using sub-pixel anti-aliasing techniques may be processed before being cached to yield processed coverage values. The processing may include modifying the coverage values by applying correction values to the initial coverage values calculated using the anti-aliasing techniques. The correction values may correct the initial coverage values in any suitable manner so as to enable caching of the coverage values and use of cached coverage values. In some embodiments, the correction values may modify the initial coverage values so as to mimic the effect of subsequently performing a gamma correction process that could be performed on a composite of text and an overlapping graphic before the composite is displayed in an interface. By mimicking the effect of a gamma correction process prior to caching the coverage values, the cached coverage values can be adjusted to compensate for nonlinearities of the display on which the text is to be displayed. Such nonlinearities of the display, as discussed above, prevent color values for text and overlapping graphics from being linearly combined. By compensating for such nonlinearities prior to caching the coverage values, when the sub-pixel coverage values are retrieved from cache, the values can be combined with color information regarding the text and a background graphic without performing a gamma correction process. The graphics engine 204 may therefore perform a coverage correction process on sub-pixel coverage values directly, without the coverage values having been combined with text color values for the sub-pixels, though the color values for the text may be used to inform the correction. As part of performing the coverage correction process, the graphics engine 204 may retrieve correction values from a data store 204B of coverage correction values. Techniques that may be used by the graphics engine 204 for correcting coverage values are discussed in detail below in connection with FIG. 5.

When the graphics engine 204 has calculated processed coverage values through any suitable processing, the processed coverage values may be written to a data structure 210 by the graphics engine 204. Any suitable data structure may be used. In some embodiments, the data structure 210 may be a four-value graphics structure that is configured to store color information regarding display elements and that a GPU is natively adapted to process. A four-value data structure may store three color values, one for each sub-pixel, and a coverage value for the pixel as a whole. An example of such a structure is a BGRA data structure that stores three color values (blue, green, and red) and a coverage ("alpha") value in a blue-green-red-alpha format. The BGRA structure may use eight bits for each of the four different values.

GPUs are adapted to process information regarding graphics efficiently when the information is in such a four-channel format, with three channels for color values and a fourth channel for coverage values. GPUs can efficiently process information in this format because the operations of the GPU and the hardware registers of the GPU are preconfigured to store values in this format and operate values in this format. Therefore, were a four-value structure to be used in accordance with techniques described herein for caching coverage information for sub-pixels, the data in the four-value format could be processed by a GPU more easily than data in other formats.

Accordingly, in some embodiments a BGRA structure may be used to store sub-pixel coverage values. As discussed above, though, to determine color information for a pixel using the techniques described herein, six values can be used for a pixel: three color values for sub-pixels of the pixel (red, green, and blue) and three coverage values for the sub-pixels of the pixel. In embodiments where the four-value structure is used to store sub-pixel coverage values, the six values cannot be stored in one data structure. Accordingly, in some embodiments the color control information may be stored separately, such as in a different four-value structure, such that each pixel may be associated with two different four-value structures. In such cases, one four-value structure can be used to store coverage values and a second four-value structure can be used to store color values.

Where GPUs are adapted to process values in the four-value structure quickly and efficiently, the GPUs may be adapted to do so where the values in corresponding locations of the four-value structure are related to one another. For example, the GPU may be adapted to quickly process data where the first value of each four-value structure relates to a blue sub-pixel. Accordingly, while in some embodiments six values may be stored in two different four-value data structures, the values may not be divided into four values in one structure and two values in another structure. If the values were divided in this way, one of the values would be placed in a location in the four-value structure that does not correspond to location of related values. For example, were the three color values (blue, green, and red) and one coverage value (blue) arranged in a four-value data structure, then the location of the blue color value in the data structure would not correspond to the location of the blue coverage value. Some GPUs would not be able to quickly and efficiently process the color values and coverage values stored in this way, as the GPU would not be natively configured to process the blue values stored at different locations. Accordingly, where the three color values and three coverage values for a pixel are partitioned, the color values may be stored in one structure and the coverage values may be stored in a different structure. In some such cases, one value in each of the four-value data structures may be left empty.

It should be appreciated, however, that other data structure formats may be used. For example, other four-value formats that organize data in a different format, like a RGBA structure, could be used. As another example, data structures having a different number of channels could be used. In some embodiments, three-channel data structures (e.g., BGR structures) may be used to store coverage values. In other embodiments, six-channel data structures could be used, which could store both a sub-pixel coverage value and a color value for each of three different sub-pixels (e.g., two values for red, green, and blue sub-pixels).

Regardless of the format of the structure 210, when processed coverage values are produced by the graphics engine 204, the processed coverage values may be output to a data structure 210. The coverage values that can be output include a coverage value for each sub-pixel of a pixel. For example, a blue coverage value, green coverage value, and red coverage value may be produced and stored. Where a data structure includes color-specific channels, sub-pixel coverage values may be stored in corresponding channels. For example, with a BGRA structure, the B channel that conventionally stores color control information for the blue color channel may be used to store blue sub-pixel coverage values.

The data structure 210 may then be used in any suitable manner. To cache the coverage values, the data structure 210 may be stored in memory 208, such as in a cache 208A of coverage values for text. The memory 208 may be any suitable memory in which information may be cached, including random-access memory (RAM) or a storage drive. Examples of RAM include system memory and video memory. Examples of storage drives include hard disk drives and solid-state drives (SSDs). The data structure 210 may also be communicated to the GPU 206 for use in graphics-related operations. For example, the data structure 210 may be sent to the GPU 206 as part of a rendering process. As part of the rendering process, the GPU 206 may determine composite color information for each sub-pixel of a display based on display elements to be displayed using each pixel. For pixels that will display text, the sub-pixel coverage values stored in the structure 210 may be used by the GPU 206 to determine the composite color values.

In some embodiments, the graphics engine 204 may configure the GPU 206 to be able to process the coverage values stored in structure 210. As discussed above, the GPU 206 may be natively adapted to process a four-channel data structure such as a BGRA structure, but the GPU 206 may be adapted to process color values in such a format, not coverage values. In some embodiments, therefore, for the GPU 206 to process the coverage values, the GPU 206 may be configured to use the structure 210 in a particular manner. The GPU 206 could be configured to use the structure 210 to modify color values for text prior to interpolating between the modified color values for the text and color values for a background graphic. For example, the GPU 206 may be configured in some cases to retrieve a sub-pixel coverage value from each of the blue, green, and red channels of a BGRA structure and not to retrieve data from the alpha channel. The GPU 206 may be further configured to multiply those sub-pixel coverage values by color values in the blue, green, and red channels in a separate BGRA structure to yield modified color values for the text. The GPU 206 may also be configured to combine the modified color values with color information for a background graphic to yield composite color values for controlling sub-pixels of the display, as discussed above. In other embodiments that do not use a four-channel structure and instead use other formats, such as a six-channel format that stores both coverage values and color values, the GPU 206 may be configured to use data in those formats in any suitable manner.

Graphics engine 204 may take any suitable actions in response to any suitable inputs from the processes 202 regarding displaying of content in a display. In some embodiments, the graphics engine 204 may calculate and cache coverage values for text in response to receiving from a process 202 the content of text that is to be displayed and a color in which the text is to be displayed. The graphics engine 204 may, in some cases, not render or display the text in response to receiving the text and font color. Instead, the graphics engine 204 may calculate sub-pixel coverage values and then create a data structure 210 and store the coverage values, such as by storing the data structure 210 in cache 208A of memory 208. In some embodiments, the graphics engine 204 may also cache the font color information at this time. Later, the graphics engine 204 may receive from the process 202 a request to render the text at a particular position on the display, such as when the text is moved in a user interface relative to a background graphic. Where the graphics engine 204 does not cache the font color, the request to render the text may also include a font color for the text. When the graphics engine 204 receives the position information from the process 202, the graphics engine 204 may retrieve sub-pixel coverage values for the text cached in the data structure 210 in the cache 208A and operate the GPU 206 to calculate, using the cached coverage values, composite color values for pixels and sub-pixels of the display that correspond to the position.

Modern user interfaces may enable users to perform a great deal of animation of user interface elements, as discussed above. Techniques described herein, by enabling caching of sub-pixel coverage values, may enable faster rendering of text to a display following such an animation. Previously, each time the text was to be re-rendered following an animation, the coverage values needed to be determined for new locations of the text, after which the coverage values were used in determining composite color values for the text and the overlapping graphics, after which the composite color values would be gamma-corrected to compensate for nonlinearities of the display. This process is intensive and slowed responsiveness of interfaces to animations. In some embodiments, instead, the sub-pixel coverage values for the text, already modified to compensate for the nonlinearities, are stored and available for retrieval. When text is to be re-rendered, then, the sub-pixel coverage values are merely retrieved and combined with color information for the text and the background graphic to be re-rendered. Such a process is more efficient and may be done using linear operations on data structures a GPU is natively adapted to process, making the operations quickly performable on a GPU. Accordingly, the re-rendering process can be made much more efficient.

As discussed above, the graphics engine 204 may carry out any suitable operations to calculate sub-pixel coverage values and cache sub-pixel coverage values when the text is first rendered, and to use the cached sub-pixel coverage values to determine composite color values for pixels when the text is to be re-rendered. In some embodiments, the graphics engine 204 may operate the GPU 206, through passing at least cached coverage values and instructions to the GPU 206, to carry out at least a portion of these operations.

Figure 3:
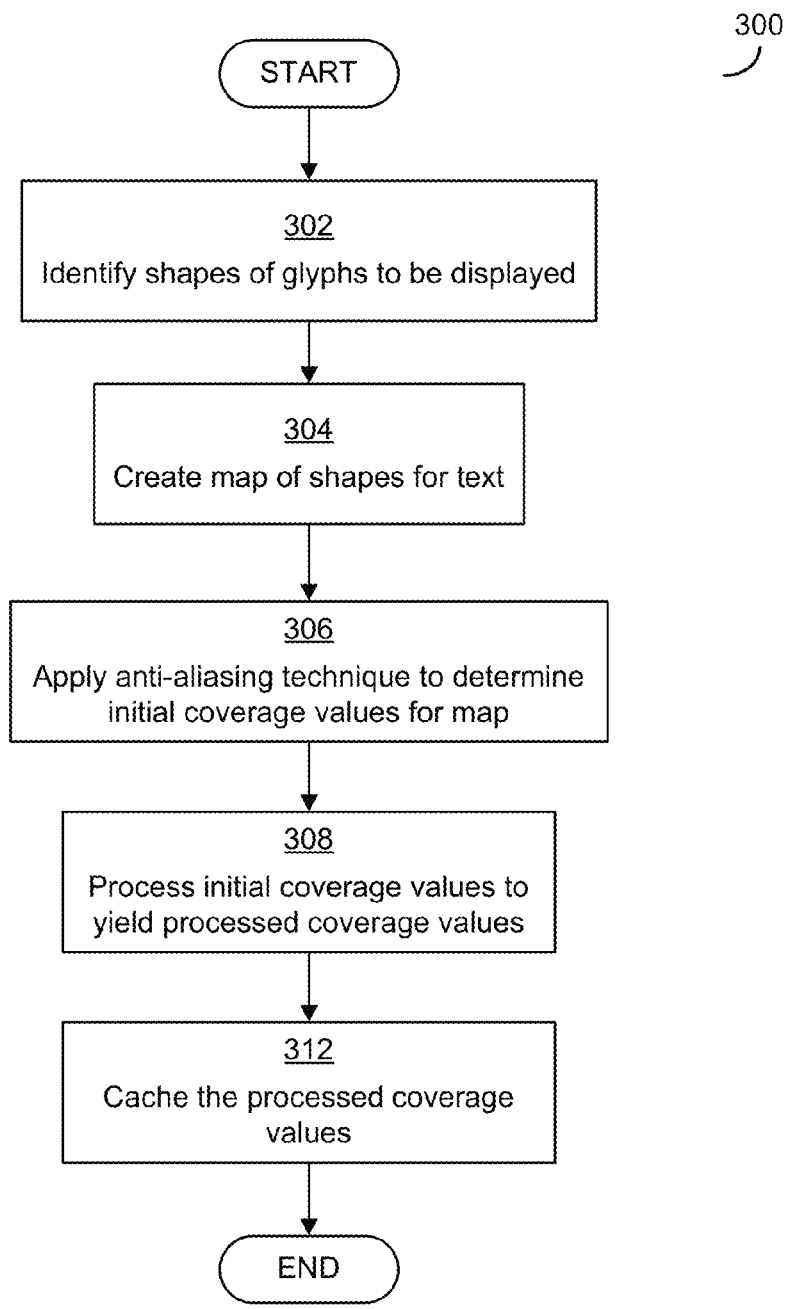
FIG. 3 is a flowchart of an exemplary process for caching coverage values of an anti-aliasing process for use in rendering text for a computer display.

FIG. 3 illustrates one exemplary process that a graphics engine may carry out (including, in some embodiments, by configuring a GPU to follow) for calculating and caching coverage values. Prior to the start of the process 300 of FIG. 3, an executing process that is executing on at least one processor of a computing device may have communicated to the graphics engine information regarding text that will be displayed in a display associated with the computing device. The information regarding the text may include content of the text to be displayed. The content may be the text itself represented as a string of characters or in any other suitable form. The information regarding the text may also in some cases include display properties for the text, such as a color for the text, a position of the text, or any other parameters regarding how the text will be displayed. Though, in other embodiments, some parameters of the text may not be received prior to the process 300, such as a position on the display at which the text will be displayed. Regardless of what information is received, once information regarding the text is received by the graphics engine, the process 300 begins.

The operations of the first three blocks of the flowchart of FIG. 3—blocks 302, 304, 306—may be carried out using known techniques. Accordingly, a detailed discussion of these operations is not necessary herein. Though, for illustration of the ways in which embodiments may be implemented, a short discussion of these operations is provided.

In block 302, the graphics engine identifies, for the content of the text, the shapes of the glyphs to be displayed. Identifying the shapes of the glyphs to be displayed may include retrieving descriptions of the shapes from a font library for the font that is to be used to display the text.

When the shapes that will be used to display the glyphs are retrieved, in block 304 the graphics engine may create a map of the shapes to pixels of the display that will be used to display the text. This map defines a relative position of each glyph and therefore defines a portion of the pixels of a display that will be affected when the text is to be rendered. This map will be used in block 306 to set coverage values for sub-pixels. Using any suitable technique, including known techniques, the map of shapes may be created with information regarding each pixel and whether each pixel will be used to draw the shapes of each of the glyphs. In some cases, the information regarding each pixel may be a binary yes or no indicating whether the pixel will be used to represent the shapes of the glyphs. In some cases using such binary values, the map may be a one-bit-per-pixel map that indicates, using a single bit for each pixel of the display, whether the pixel is to be used in drawing the map. In other cases using binary values, the map may be oversampled in either or both of the two dimensions of the text. For example, using known CLEARTYPE® techniques, an oversampled mapping may be created by taking multiple "samples," from the glyph shape, for each pixel that will be used to represent at least a portion of the glyph shape. CLEARTYPE® takes the samples by considering a pixel to be divided into equal regions corresponding to the amount of the oversampling: 6×1 regions (i.e., six regions in the horizontal direction, in a single row in the vertical direction) or 6×5 regions (i.e., six regions in the horizontal direction, in five rows in the vertical direction). When the shapes of the glyphs are compared to the pixels and the equal regions identified for each pixel, a binary value can be used to indicate whether the shape overlaps a particular region.

The graphic engine can create the map of block 304 by creating individual maps for each glyph and then merging these individual maps to create a map for the text, or by merging the glyphs and creating a map for the text as a whole, as embodiments are not limited in this respect.

Once the map is created in block 304, the map is used in block 306 to set coverage values for sub-pixels of the display that will be used to render the text. The map may be used in any suitable manner to set the coverage values, including using known techniques for sub-pixel anti-aliasing. For example, using known techniques, the coverage values may be set based on the binary values of the map, including based on the binary values of an oversampled map. For the oversampled map, for example, the coverage values may be set in proportion to a number of regions that, according to the sampling, will be used to represent the shape of the glyph. Setting the coverage values based on the oversampled map may be done in any suitable manner, including using known techniques, as embodiments are not limited in this manner. For example, for sub-pixel anti-aliasing, coverage values may be determined using CLEARTYPE® techniques for each of the sub-pixels of a pixel. Where oversampling is used, some of the regions of a pixel will correspond to each of the sub-pixels of that pixel. The coverage value for a sub-pixel can be set in proportion to how many samples, corresponding to that sub-pixel, correspond to the shape of the glyph. Where a sub-pixel corresponds to more samples than correspond to the shape of the glyph, the coverage value for the sub-pixel can be set so as to show a darker shading/color for the text using that sub-pixel. Conversely, where the sub-pixel corresponds to fewer samples, the coverage value can be set so as to show a lighter shading/color.

Accordingly, where a pixel consists of three horizontally-arranged sub-pixels, three different coverage values can be determined: one for each sub-pixel. In some embodiments, the coverage values for each sub-pixel may be calculated based on preliminary coverage values. For example, in cases where multiple vertical rows of samples were taken for each pixel in block 304—such as in the 6×5 sampling example discussed above—and a pixel consists of three horizontally-arranged sub-pixels, multiple coverage values can be first obtained for each sub-pixel. This may be done by determining coverage values for each sub-pixel for each row of samples, as in the preceding 6×1 example, which would yield, for a sub-pixel, five preliminary coverage values for each sub-pixel; one for each row of the samples. These preliminary coverage values could then be combined in any suitable manner to yield a single coverage value for a sub-pixel, including by averaging the preliminary coverage values for the sub-pixel.

Through the operations of blocks 302, 304, 306, the graphics engine can determine a set of sub-pixel coverage values for sub-pixels that will be used to display the text requested by the executing process prior to the start of process 300. The sub-pixel coverage values calculated in block 306 may be considered to be "initial" coverage values, as in some embodiments these coverage values may be further processed in some manner to yield processed coverage values for the sub-pixels. For example, initial coverage values yielded by the sub-pixel anti-aliasing process applied in block 306 may be adjusted based on user preferences to yield processed coverage values. Any other processing may also be performed, as embodiments are not limited in this respect. Accordingly, in block 308 the graphics engine processes the initial coverage values in some manner to yield processed coverage values.

In some embodiments, through the processing of block 308, the coverage values may be adjusted so as to permit color information regarding the text (including the sub-pixel coverage values) to be combined directly and linearly with color information regarding other display elements, such as background graphics to be displayed together with the text, without requiring further modification. Using conventional techniques, when coverage values are used, together with color information regarding the text and color information regarding a background image, to determine composite color values for controlling sub-pixels of a display to show the text, extra processing must be performed to correct the combination. Such extra processing may include gamma correction. This is because, as discussed above, when color information for the text and the graphic is combined using linear interpolation, humans will not perceive a resulting composite color value to be correct. The result of the interpolation is therefore, using conventional techniques, modified during a gamma correction process to yield corrected composite color values. During the processing of block 308, however, the graphics engine may process the initial coverage values so as to compensate for nonlinearities of the display and enable color information about the text to be combined with color information about background graphics with limited subsequent processing. For example, the initial coverage values may be modified so as to enable linear combination of color information to yield composite color values for displaying the text together with the background graphics. As another example, the initial coverage values may be modified so as to eliminate performance of a gamma correction process following the interpolation.

The graphics engine may carry out any suitable processing of coverage values in any suitable manner in block 308. Examples of processing that may be carried out are discussed in detail below in connection with FIGS. 5 and 6.

Once the graphics engine has processed the coverage values to yield processed coverage values, in block 310 the graphics engine caches the processed coverage values. The graphics engine may cache the processed coverage values in any suitable manner. In some embodiments, the graphics engine may cache the processed coverage values in a data structure having a size and organization matching an organization of the hardware and native operations of a graphics processing unit (GPU). For example, the graphics engine may cache processed sub-pixel coverage values for each pixel that will be used to display text in a display in a four-value data structure having fields for three color values and one coverage value. Once arranged in the four-value data structure, the coverage values may be stored in memory of a computing device. The coverage values may be stored in a memory of the computing device for later use during rendering, including in a system memory, video memory, or a storage drive of the computing device.

Once the sub-pixel coverage values that were processed in block 308 are stored in block 310, the process 300 ends. Following the process 300, the graphics engine may take any suitable actions regarding the sub-pixel coverage values. In some embodiments, the graphics engine may provide an identifier for the cached sub-pixel coverage values to the executing process that originally provided the text. The identifier provided to the executing process may be any suitable identifier, including an address for the cached coverage values in memory or an identifier used by the graphics engine and that the graphics engine can subsequently use to retrieve the cached coverage information.

The graphics engine can subsequently use the cached coverage values in any suitable manner and at any suitable time. The graphics engine may subsequently receive from the executing process a request to render and display the text on the display. The executing process may make the request following any suitable operations or in response to any suitable conditions, as embodiments are not limited in this respect. In some embodiments, the executing process may request that the text be displayed in response to a user requesting to view an interface or in response to a user interacting with the interface. User interactions may prompt a re-display or update of a display of the text when the interactions effect a change to the text, such as when the user animates the text. For example, when the text is moved in the interface relative to background graphics or otherwise animated, the text may be re-displayed. Other animations of a user interface not resulting from an interaction with a user may prompt a re-rendering of the text. For example, where the user interface is configured to show the text scrolling across the display, the text may be re-rendered repeatedly during that scrolling.

Figure 4:
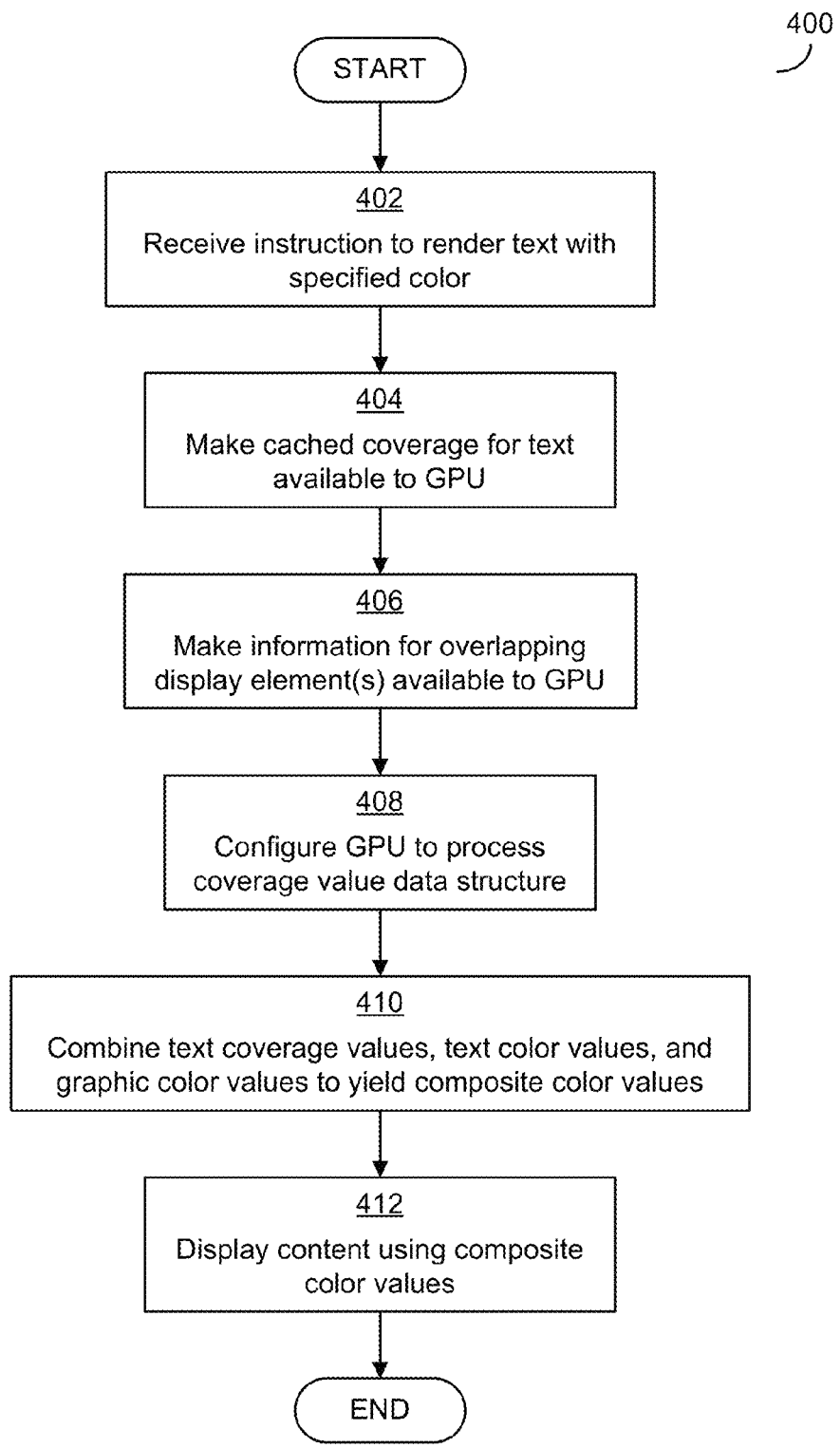
FIG. 4 is a flowchart of an exemplary process for retrieving coverage values of an anti-aliasing process from a cache for use in rendering text to a computer display.

In response to receiving the request from the executing process, the graphics engine may carry out various operations to display text for which coverage values have been cached. The process 400 of FIG. 4 is one example of a technique that may be implemented by a graphics engine for displaying text for which coverage values have been cached.

Prior to the start of the process 400, sub-pixel coverage values may have been created, processed, and cached in any suitable manner, including by the process 300 of FIG. 3. The process 400 begins in block 402, in which the graphics engine receives at least one instruction from an executing process to render the text. The instruction(s) from the executing process may include any suitable display properties for the text. In some embodiments, the information about the text may include a font color with which the text is to be displayed and a position at which the text is to be displayed. The instruction(s) may also include any suitable identifier for the sub-pixel coverage values that were previously determined and cached. In some embodiments, the instruction(s) may include an address for the cached sub-pixel coverage values in memory or an identifier maintained by the graphics engine for the cached coverage values that the engine can use to retrieve the values.

To permit the GPU to determine composite color values for re-rendering the text the graphics engine, in block 404, makes available to a graphics processing unit (GPU) the cached sub-pixel coverage values for the text. In some cases, the graphics engine may retrieve the cached coverage values from memory in response to the instruction of block 402 and store the cached coverage values in a memory location accessible to the GPU. In other cases, the graphics engine may have previously placed the cached coverage values in a memory location accessible to the GPU. Where the cached coverage values were made available to the GPU, the graphics engine may, in some cases, ensure that the cached coverage values are still available to the GPU. Once the coverage values for the text have been made available, in block 406 the graphics engine makes available to the GPU in a similar fashion information for one or more other display elements of the interface that will be displayed overlapping with the text. The one or more other display elements may include a background graphic that will be displayed together with the text and overlapping with the text in certain positions of the display. The information on the other display elements may include color values for pixels or sub-pixels of the display to display the other display elements.

As discussed above, when two or more display elements are to be displayed overlapping in a graphical interface, a color value for each pixel of the display is calculated based on the colors of the display elements so as to create the overlapping effect. A GPU of a computing device is configured to perform various operations related to rendering graphics quickly. Among these operations is determining a composite color for a pixel based on colors of display elements.

GPUs are typically configured to carry out such operations on four-value data structures, such as the BGRA data structure discussed above. Such data structures have color values for each of three sub-pixels and a coverage value for a pixel as a whole. GPUs are not conventionally configured to process coverage values for each of multiple sub-pixels, though, and are not adapted to process BGRA data structures where the color channels of the four-value structure (i.e., the BGR channels) store sub-pixel coverage values. GPUs are instead conventionally configured to use color values stored in these channels. In some embodiments, however, the sub-pixel coverage values that are retrieved in block 404 may be processed by a GPU as part of determining a composite color value for a sub-pixel based on color information for text and color information for a background graphic. Accordingly, in block 408, a GPU may be configured to process a four-value data structure that stores, in at least three channels, sub-pixel coverage information. The configuring of block 408 may be carried out in any suitable manner. In some cases, the configuring of block 408 may include providing the GPU with instructions to be executed that use the data stored in a four-value data structure as sub-pixel coverage values. The GPU may use the sub-pixel coverage values from such a structure in any suitable manner, including by combining the sub-pixel coverage values with color information for text.

Once the GPU is configured in block 408, in block 410 the GPU can execute the instructions with which the GPU was configured. In particular, in block 410 the GPU determines composite color values for sub-pixels of a display that will display the text and a background graphic overlapping. The GPU may combine, for each sub-pixel, coverage values and color values for the text with color values for a background graphic to yield a composite color values for the sub-pixel. In some embodiments, the GPU may perform a linear interpolation between the color values for the text and the color values for the graphic. To perform such a linear interpolation, the GPU may add the color values for the text to the color values for the graphic to determine the composite color values, with the sub-pixel coverage values for the text being used to weight the addition. For example, the sub-pixel coverage values for each color channel for a pixel may be multiplied by the color values for the corresponding color channel and pixel for the text, prior to being added to the color values for the background graphic. Additionally or alternatively, the complement of a sub-pixel coverage value may be multiplied by the background color value before being added to the text color value. More particularly, in some embodiments the composite color value for a sub-pixel may be determined by multiplying the text color value (C) by the sub-pixel coverage value ($\alpha$), multiplying the background color value (B) by the complement of the sub-pixel coverage value ($1-\alpha$), and added together those products ($C*\alpha+(1-\alpha)*B$).

As discussed above, the sub-pixel coverage values that are cached and retrieved in block 404 from the cache may have been processed so as to enable the linear combination of the text color values and background color values in this way. The sub-pixel coverage values may have been processed so as to limit or eliminate further processing of the composite coverage values following the linear combination. For example, the sub-pixel coverage values may have been processed so as to make a gamma correction process following the linear interpolation unnecessary. Rather, once the composite color values for each sub-pixel are determined through the linear interpolation, those composite color values may be used in displaying the text and the background graphic. For example, the composite color values may be used directly to control a display or in further operations to combine the composite color values with color information regarding other display elements to yield further composite color values.

Accordingly, once the composite color values are calculated for each sub-pixel of the display that will be used to display the text and the background graphic, in block 412 the composite color values may be used to display the content in a display. Once the content is displayed, the process 400 ends.

Following the process 400, the user may again interact with the interface and may animate the text in the interface. When the text is animated again, the process 400 may be repeated to determine, based on the cached sub-pixel coverage values for the text, new composite values for each of the sub-pixels of the display.

Through the caching of sub-pixel coverage values, the rendering of text together with overlapping graphics may be made more efficient and operate more quickly. The operations on hardware to carry out the rendering and the commands to render may be made more efficient as well. For example, in some embodiments a single API call may be made to combine the cached sub-pixel coverage values with underlying graphics. For example, a single API call may be made to blend the sub-pixel coverage value with a destination surface, where the destination surface had been previously defined using color information regarding background graphics. Further, once a graphics processing unit is configured to recognize the sub-pixel coverage values stored in the four-channel data structure, the blending triggered by the API call may be performed by the GPU with a single pass over the sub-pixels of the display, rather than through repeated operations on each sub-pixel.

As discussed above in connection with FIG. 3, when initial sub-pixel coverage values are determined for text using a sub-pixel anti-aliasing process, those initial coverage values may be processed in some way to yield processed coverage values. The processing may include processing related to user preferences, related to eliminating or reducing the need for a gamma correction process to be performed later, or any other processing. Embodiments are not limited in this respect.

Figure 5:
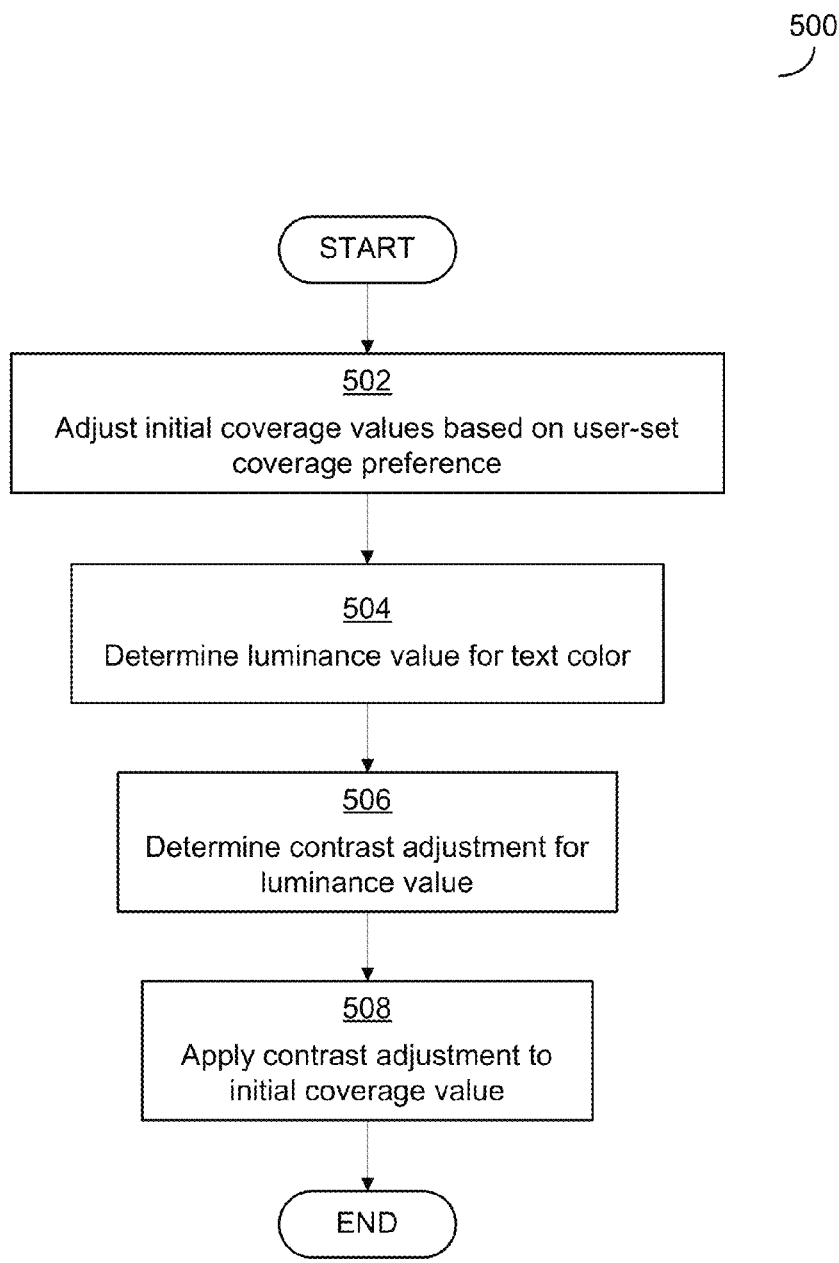
FIG. 5 is a flowchart of an exemplary process that may be performed as part of calculating coverage values for an anti-aliasing process.
Figure 6:
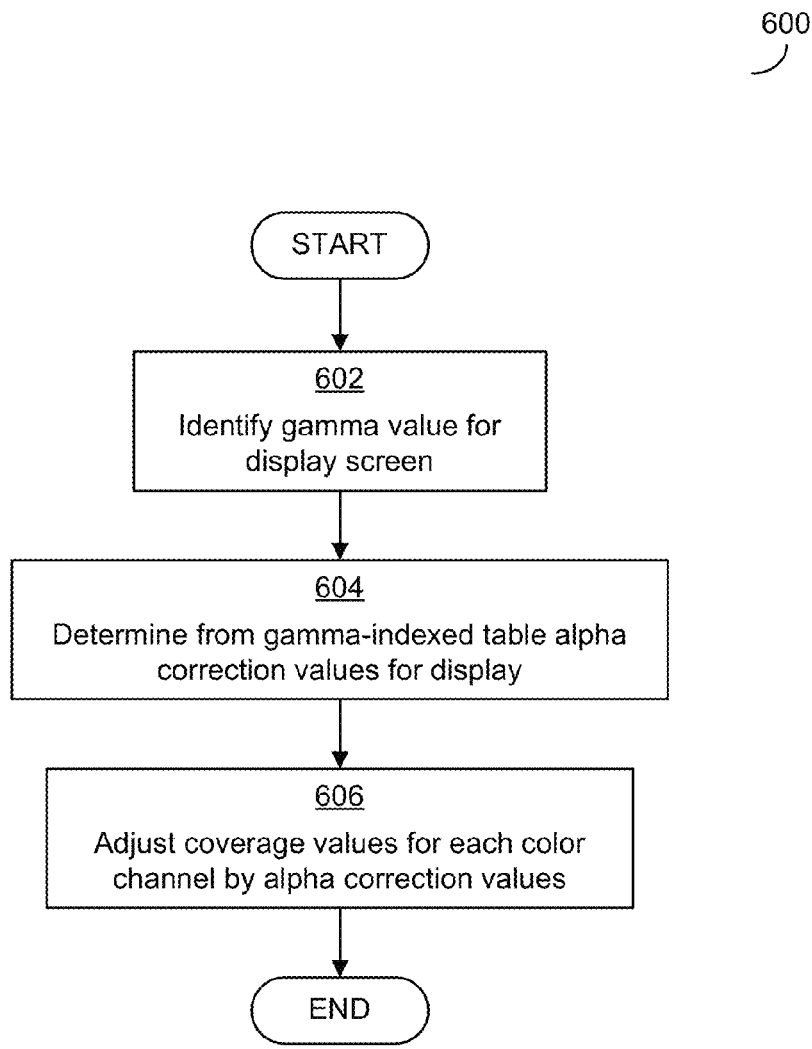
FIG. 6 is a flowchart of an exemplary process for correcting coverage values so as to avoid performing a gamma correction process.

FIGS. 5-6 show two exemplary processes that may be used to process initial coverage values, determined using sub-pixel anti-aliasing techniques, before the sub-pixel coverage values are cached.

Prior to the start of the process 500 of FIG. 5, a graphics engine receives content of text that will be displayed and a font color for the text and calculates sub-pixel coverage values for the text. Through the process 500, these coverage values may be modified.

The process 500 begins in block 502, in which the graphics engine adjusts the initial sub-pixel coverage values based on user preference regarding anti-aliasing techniques. As discussed above, anti-aliasing techniques are used to make text more pleasing for a human user to view. Different users may have different comfort levels regarding text and some computing devices may therefore permit a user to specify a degree to which the anti-aliasing should be perceived as sub-pixel anti-aliasing rather than grayscale anti-aliasing. For example, when a user preference value is set a certain way (e.g., to a zero value), the graphics engine may perform a grayscale anti-aliasing process rather than a sub-pixel anti-aliasing process by keeping all sub-pixel coverage values for a pixel identical. Such user preferences and the ways of setting them are known in the art and embodiments may implement any suitable technique for applying such preferences, including known techniques.

In block 502, the sub-pixel coverage values that were initially determined may be adjusted based on the user preference setting. The adjustment of block 502 may be carried out in any suitable manner, including using known techniques. MICROSOFT® CLEARTYPE® text rendering software includes a known technique for adjusting coverage values, based on user preference, that may be used in some embodiments. A detailed discussion of adjusting the coverage values is therefore not necessary herein. In short, in block 502 the graphics engine may balance the coverage value set for each sub-pixel, based on the user preference, against the coverage value set for adjacent sub-pixel of the pixel. For example, in displays that include three sub-pixels arranged in an ordering of red, green, and blue (as in the example of FIG. 1A), the coverage values for the red and green sub-pixels may be balanced against one another and the coverage values for the green and blue sub-pixels may be balanced against one another. The graphics engine may use linear interpolation to perform the balancing. For example, a red sub-pixel coverage value may be adjusted by multiplying the user preference value ($\beta$) by the initial red sub-pixel coverage value ($\alpha_r$), multiplying the complement of the user preference value ($1-\beta$) by the initial green sub-pixel coverage value ($\alpha_g$), and adding those products, such that the equation (1) is carried out:

$$\alpha_r' = \alpha_r * \beta + \alpha_g * (1-\beta) \tag{1}$$

A similar calculation may be carried out for the blue sub-pixel coverage value, through applying equation (2).

$$\alpha_b' = \alpha_b * \beta + \alpha_g * (1-\beta). \tag{2}$$

After adjusting the initial coverage values based on user preference, the graphics engine may further adjust the coverage values based on a luminance of the color for the text, so as to ensure that the text is displayed with good contrast and is therefore visible. As a first step, in block 504, the graphics engine calculates a luminance of the font color, which was received as input from the executing process requesting that the text be displayed. The luminance value L is obtained through weighting and adding color values for the font color for the three additive color components red, green, and blue. In particular, the luminance (L) may be set through applying the equation (3):

$$L = 0.30 * R + 0.59 * G + 0.11 * B \tag{3}$$

where the R, G, and B are the color values for the font color.

In block 506, the graphics engine may identify a contrast adjustment to be made based on the luminance, so as to ensure good contrast of the text with the background. This may be carried out in any suitable manner, including known techniques such as those employed by MICROSOFT® CLEARTYPE® text rendering software. In some embodiments, a computing device may have a base contrast value that the graphics engine may adjust based on the luminance of the text. This base contrast value may be set based on user preference or may be fixed, or may be set in any other manner, as embodiments are not limited in this respect. The amount of adjustment of the base contrast value (k) may depend on the luminance value calculated in block 504. For example, where the luminance value is calculated as less than or equal to 0.5, an adjustment variable (c) may be set to 1, so as not to adjust the base contrast value. Where the luminance value is calculated to be greater than 0.5 and less than 0.75, the adjustment value may be set based on the luminance value (L), such as through applying the equation (4):

$$c = 4 * (0.75 - L) \tag{4}$$

Where the luminance value is calculated to be greater than or equal to 0.75, the adjustment value may be set to 0, so as to disable adjustment of coverage values based on the contrast.

Once the adjustment value (c) is set, the base contrast value may be adjusted by multiplying the base contrast value by the adjustment value through applying equation (5):

$$k'=k*c \qquad (5)$$

In block 508, the graphics engine may then modify the sub-pixel coverage values, which were modified in block 502, again based on the contrast value (k') determined in block 506. In particular, each of the modified sub-pixel coverage values (α') may be modified based on the contrast value (k') to yield a further modified sub-pixel coverage value (α") by applying the equation (6):

$$\alpha'' = \frac{\alpha' * (k' + 1)}{\alpha' * k' + 1} \qquad (6)$$

Once each of the sub-pixel coverage values for the text are modified using the equation (6), the process 500 ends.

Process 600 illustrates another exemplary process that may be used to process initial coverage values. In some embodiments, the process 600 may be used together with the process 500 and may be performed by the graphics engine following the process 500, though embodiments are not limited in this respect.

Prior to the start of the process 600 of FIG. 6, a graphics engine receives content of text that will be displayed and a font color for the text and calculates sub-pixel coverage values for the text. Through the process 600, these coverage values may be modified.

The process 600 begins in block 602, in which the graphics engine identifies the gamma value (γ) associated with the display that will be used to display the text. The gamma value for a display is a value obtained in a known way, which may be set by a manufacturer of the display and might be adjusted by a user. The graphics engine may identify the gamma value in block 602 in any suitable manner, including by retrieving the gamma value from a data store of the computing device, such as a data store associated with a driver for the display.

In block 604, the graphics engine may use the gamma value (γ) to determine, for each sub-pixel coverage values, at least one alpha correction value to use in correcting the sub-pixel coverage values. The alpha correction value may be any value that modifies the sub-pixel coverage values so as to mimic the effect of a gamma correction process. When the sub-pixel coverage values are adjusted in a way that mimics the effect of a gamma correction process, color information for text that uses the sub-pixel coverage values may be combined linearly with color information for background graphics without the need for a gamma correction process. As a result, the gamma correction process may be eliminated from a process for rendering text and the rendering process may be expedited.

Processes that modify sub-pixel coverage values so as to mimic the effect of a gamma correction process are known, and any of these processes may be used in blocks 604 and 606. One such process for determining alpha correction values is known as an alpha correction process and is described in detail in U.S. Pat. No. 6,933,947 ("the '947 patent"), filed on Dec. 3, 2002, and entitled "Alpha correction to compensate for lack of gamma correction." The '947 patent is hereby incorporated by reference herein in its entirety, and at least for its discussion of determining alpha correction values. In short, the alpha correction process described in the '947 patent creates a table of alpha correction values, indexed by gamma values. These alpha correction values are determined for each of a range of gamma values and each of a range of font and background colors, based on observations of the impact of a gamma correction process on composite colors yielded from a combination of font and background colors. Through repeated observation of the impacts of gamma correction, an impact of gamma correction on a font color can be identified for each gamma value. For example, a constrained optimization may be performed, for each gamma value, on each of the impact values determined from the repeated observations. From this constrained optimization, alpha correction values can be identified for each gamma value and stored in a gamma-indexed table. In block 604, therefore, a gamma-indexed table may be queried based on the gamma value identified in block 602, and alpha correction values corresponding to the gamma value can be retrieved.

In block 606, the alpha correction values can be combined with the sub-pixel coverage values to yield corrected sub-pixel coverage values. The '947 patent describes identifying, through the repeated observations, four alpha correction values for each gamma value, though any suitable number of alpha correction values may be determined in used. The '947 patent describes modifying a sub-pixel coverage value based on the four alpha correction values and based on the font color. In particular, the '947 patent describes first determining a luminance value (F) for the font color using the luminance equation (3) above. The luminance value for the font color can then be modified using the gamma value (γ) to yield a gamma-modified font luminance (f) using equation (7):

$$f = F^{(1/\gamma)} \qquad (7)$$

The gamma-modified font luminance and the four alpha correction values ($c_1$, $c_2$, $c_3$, and $c_4$) may then be used to modify each sub-pixel coverage value (α) to yield a corrected coverage value ($\alpha_{corrected}$) using equation (8):

$$\alpha_{corrected} = \alpha + \alpha*(1-\alpha)*(c_1*\alpha + c_2*\alpha + c_3*f + c_4) \qquad (8).$$

In some embodiments, rather than the graphics engine performing each of the equations (7) and (8) for each of the sub-pixel coverage values in blocks 604 and 606, the graphics engine may retrieve corrected sub-pixel coverage values from another graphics facility that has access to a gamma-indexed table of alpha correction values. In such embodiments, the graphics engine may provide to the other graphics facility a sub-pixel coverage value, a gamma value for the display, and a color value for the sub-pixel to which the sub-pixel coverage value corresponds. The other graphics facility may then return to the graphics engine a corrected sub-pixel coverage value through examining the gamma-indexed table and performing the equations (7) and (8).

Regardless of how the coverage values are corrected, once the graphics engine adjusts each of the sub-pixel coverage values by the alpha correction values in block 606, the process 600 ends.

The processes 500 and 600 of FIGS. 5 and 6 can be used to process initial coverage values so as to yield processed coverage values. As discussed above in connection with FIG. 3, once the graphics engine processes the coverage values, the sub-pixel coverage values may be cached, such as in a four-channel data structure. Accordingly, following either or both of the processes 500, 600 the processed coverage values may be arranged in a data structure and placed in a cache.

As also discussed above in connection with FIG. 3, embodiments are not limited to caching the sub-pixel coverage values using any particular data structure or data format. Rather, embodiments may arrange sub-pixel coverage values in any suitable data structure. In some embodiments, color values for the text may additionally be cached in a separate data structure. While any structure can be used, some structures may be advantageous and may be used in some embodiments, such as the four-value structure described above that GPUs are natively adapted to process.

In some embodiments, sub-pixel coverage values may be arranged in multiple four-value data structures, as discussed above, and these multiple structures may be arranged together in a container structure, such as a texture atlas. A container structure may be used in some embodiments where the text is to be displayed on the display using multiple colors, such as one color for a first portion of the text and another color for a second portion of the text. As should be appreciated from the foregoing discussion, sub-pixel coverage values may be set based at least in part on the font color that will be used for the text. Accordingly, where different font colors are to be used, different coverage values may result. In some embodiments, those different coverage values may be stored together in one map. In other embodiments, however, different maps may be generated and then arranged together in a texture atlas.

Figure 7:
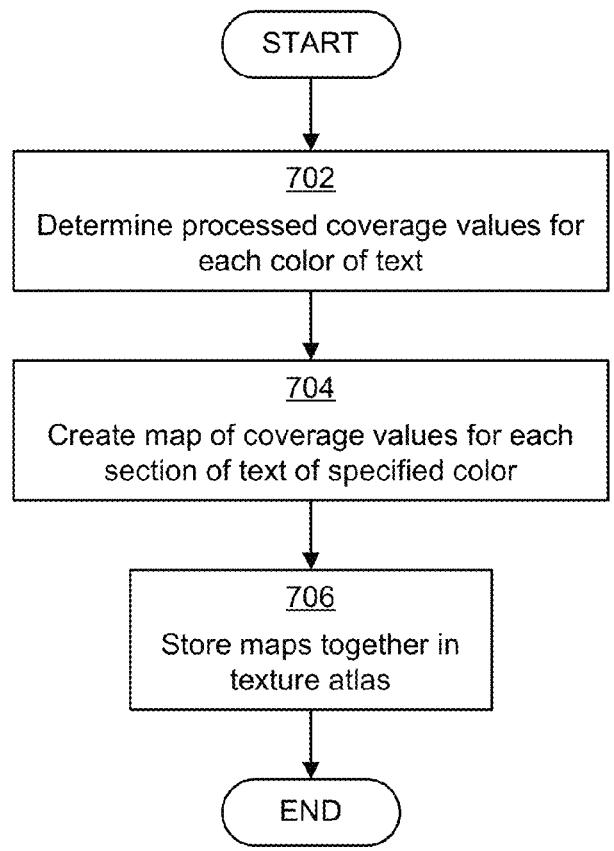
FIG. 7 is a flowchart of an exemplary process for storing coverage values for text to be displayed with different colors.

FIG. 7 illustrates one exemplary process that may be carried out for arranging multiple maps together in a texture atlas. The process 700 begins in block 702, in which the graphics engine determines processed sub-pixel coverage values for each color that will be used to display the text. The processed sub-pixel coverage values may be determined in any suitable manner, including according to techniques described above.

In block 704, for each of the specified colors, the graphics engine generates a map that includes the coverage values for sub-pixels that will be used to display text of that color. The content of each map will therefore correspond to the sub-pixels and pixels of a display that correspond to the portions of the text that are to be displayed using the color associated with that map. Each of the maps may be arranged in any suitable data structure, including in a BGRA data structure.

The graphics engine then, in block 706, arranges the multiple maps from block 704 together in a container structure, which in some embodiments may be a texture atlas. Once the data structures are arranged together, the container structure may be cached in any suitable manner. After the container structure is cached, the process 700 ends.

Techniques operating according to the principles described herein may be implemented in any suitable manner. Included in the discussion above are a series of flow charts showing the steps and acts of various processes that calculate and cache sub-pixel coverage values and use the cached sub-pixel coverage values in rendering text for display in a display. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one of ordinary skill in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of software. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of a software element or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application or software system. For example, in some embodiments functional facilities implementing these techniques may be incorporated into software applications as part of a graphics functionality of the software application, and/or into a graphics rendering system such as the Direct2d™ or DIRECTX® systems available from the Microsoft Corporation of Redmond, Wash. In other implementations, the functional facilities may be adapted to interact with other functional facilities in such a way as form an operating system, including the WINDOWS® operating system, available from the Microsoft Corporation of Redmond, Wash. In other words, in some implementations, the functional facilities may be implemented alternatively as a portion of or outside of an operating system.

Some exemplary functional facilities have been described herein for carrying out one or more tasks, including the graphics engine described above. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner, including as computer-readable storage media 806 of FIG. 8 described below (i.e., as a portion of a computing device 800) or as a stand-alone, separate storage medium. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, including the exemplary computer system of FIG. 2, or one or more computing devices (or one or more processors of one or more computing devices) may be programmed to execute the computer-executable instructions. A computing device or processor may be programmed to execute instructions when the instructions are stored in a manner accessible to the computing device/processor, such as in a local memory (e.g., an on-chip cache or instruction register, a computer-readable storage medium accessible via a bus, a computer-readable storage medium accessible via one or more networks and accessible by the device/processor, etc.). Functional facilities that comprise these computer-executable instructions may be integrated with and direct the operation of computing devices including a single multi-purpose programmable digital computer, a coordinated system of two or more multi-purpose computers (co-located or geographically distributed) sharing processing power and jointly carrying out the techniques described herein, a single computer or coordinated system of computers (co-located or geographically distributed) dedicated to executing the techniques described herein, one or more Field-Programmable Gate Arrays (FPGAs) for carrying out the techniques described herein, or any other suitable device.

Figure 8:
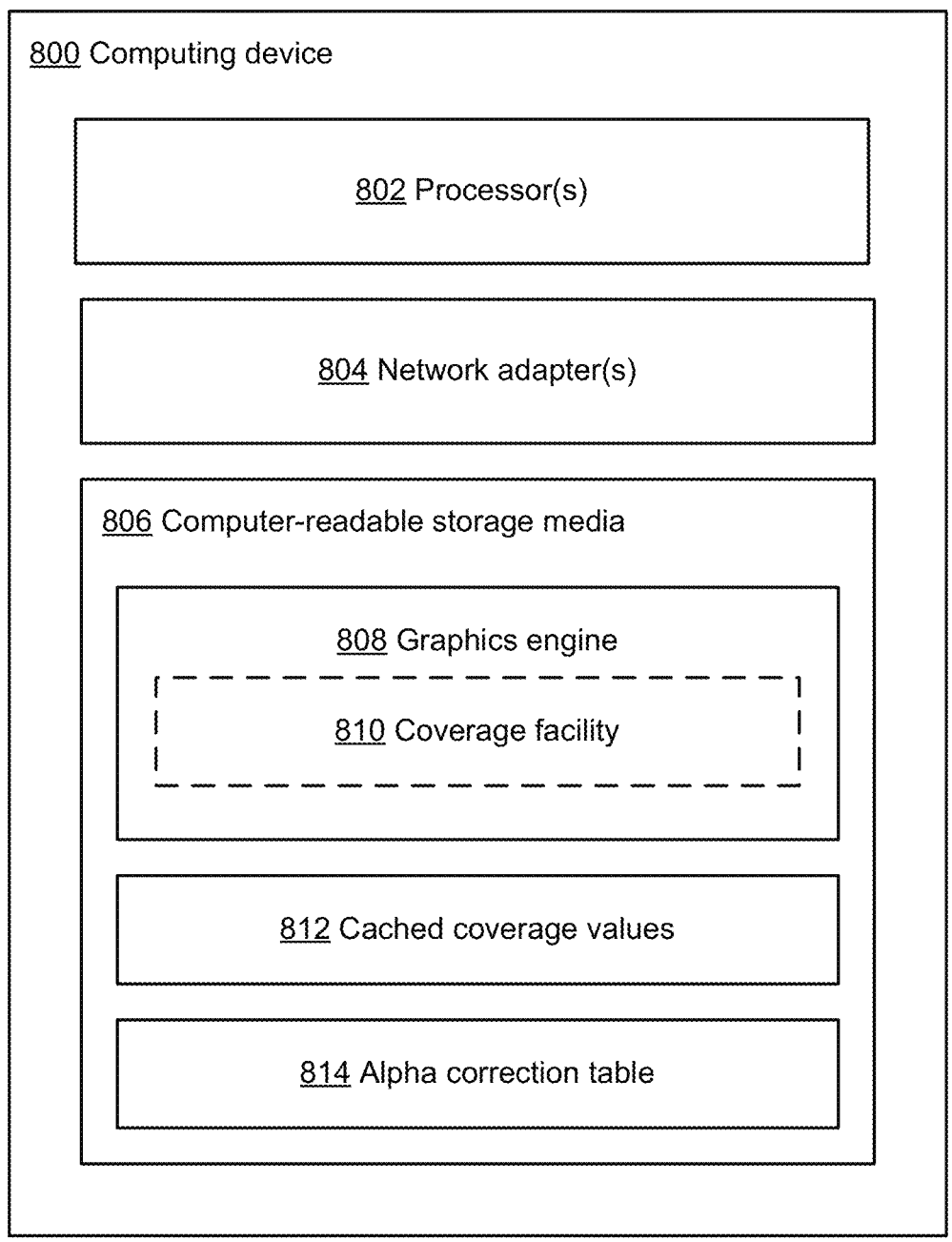
FIG. 8 is a block diagram of a computing device with which some embodiments may operate.

FIG. 8 illustrates one exemplary implementation of a computing device in the form of a computing device 800 that may be used in a system implementing the techniques described herein, although others are possible. It should be appreciated that FIG. 8 is intended neither to be a depiction of necessary components for a computing device to operate in accordance with the principles described herein, nor a comprehensive depiction.

Computing device 800 may comprise at least one processor 802, a network adapter 804, and computer-readable storage media 806. Computing device 800 may be, for example, a desktop or laptop personal computer, a personal digital assistant (PDA), a smart mobile phone, a tablet computer, a server, or any other suitable computing device. Processors 802 may include any suitable processors, including central processing units (CPUs) and/or graphics processing units (GPUs). Network adapter 804 may be any suitable hardware and/or software to enable the computing device 800 to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable storage media 806 may be one or more media adapted to store data to be processed and/or instructions to be executed by processor 802. Processor 802 enables processing of data and execution of instructions. The data and instructions may be stored on the computer-readable storage media 806 and may, for example, enable communication between components of the computing device 800.

The data and instructions stored on computer-readable storage media 806 may comprise computer-executable instructions implementing techniques which operate according to the principles described herein. In the example of FIG. 8, computer-readable storage media 806 stores computer-executable instructions implementing various facilities and storing various information as described above. Computer-readable storage media 806 may store a graphics engine 808 to render and display text in a display associated with the computing device 800. The graphics engine 808 may include a coverage facility 810, which may be implemented as part of the graphics engine 808 for determining, processing, and caching sub-pixel coverage values. The computer-readable storage media 806 may also include a data store 812 of cache coverage values for text that is or will be displayed on the display. The computer-readable media 806 may also store a table 814 of alpha correction values, which may be used by the graphics engine 808 and/or the coverage facility 810 to determine and process sub-pixel coverage values.

While not illustrated in FIG. 8, a computing device may additionally have one or more components and peripherals, including input and output devices. These devices can be used, among other things, to present a user interface. Examples of output devices that can be used to provide a user interface include printers or displays for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A method of processing text that will be displayed in a graphical interface of a computing device, the method comprising:
    creating a mapping for the text, the mapping comprising information representing at least one shape of the text and corresponding to a plurality of sub-pixels of a display to be used in displaying the text;
    determining initial sub-pixel coverage values for the plurality of sub-pixels using a sub-pixel anti-aliasing technique;
    processing the initial sub-pixel coverage values to yield processed sub-pixel coverage values for a plurality of pixels of image data corresponding to the plurality of sub-pixels; and
    caching the processed sub-pixel coverage values for subsequent use in rendering the text in the graphical interface in a video memory organized in accordance with a format that includes a red channel from which a graphics processing unit (GPU) of the computing device is natively configured to retrieve red sub-pixel color values, a green channel from which the GPU of the computing device is natively configured to retrieve green sub-pixel color values, and a blue channel from which the GPU of the computing device is natively configured to retrieve blue sub-pixel color values, wherein the caching includes caching the processed sub-pixel coverage values in at least one of the red channel, the blue channel, or the green channel.

2. The method of claim 1, wherein caching the processed sub-pixel coverage values comprises storing the processed sub-pixel coverage values in the video memory without storing information on a color with which the text is to be displayed in the graphical interface in the video memory.

3. The method of claim 1, wherein the video memory includes a BGRA surface data structure.

4. The method of claim 3, further comprising:
    reconfiguring the GPU to retrieve the cached processed sub-pixel coverage values from the video memory.

5. The method of claim 1, wherein processing the initial sub-pixel coverage values to yield the processed coverage values comprises adjusting the initial sub-pixel coverage values so as to compensate for nonlinearities of the display on which the graphical interface is to be displayed.

6. The method of claim 5, further comprising rendering the text in the graphical interface on the display without performing a gamma correction process at a time of the rendering of the text.

7. The method of claim 5, wherein adjusting the initial sub-pixel coverage values so as to compensate for nonlinearities comprises modifying the initial sub-pixel coverage values so as to enable composite color values for controlling the display to be calculated by linearly combining the initial sub-pixel coverage values and color values for the text with color values for at least one other display element that is to be displayed overlapping with the text.

8. The method of claim 1, wherein the creating, determining, processing, and caching are performed in response to receiving from an executing process an instruction comprising at least content of the text and not including a position on the display at which the text is to be rendered.

9. An apparatus, comprising:
    at least one processor programmed to:
        in response to receiving a request to render text for a display, retrieve from a cache sub-pixel coverage values for the text, the cache having a red channel from which at least one graphics processing unit (GPU) of the apparatus is natively configured to retrieve red sub-pixel color values, a green channel from which the at least one GPU of the apparatus is natively configured to retrieve green sub-pixel color values, and a blue channel from which the at least one GPU of the apparatus is natively configured to retrieve blue sub-pixel color values, wherein the sub-pixel coverage values for the text are stored in at least two of the red, blue, or green channels;
        configure the at least one GPU to determine composite color values for pixels of the display at which the text is to be displayed, the configuring comprising configuring the at least one GPU to retrieve the sub-pixel coverage values from the at least two of the red, green, or blue channels;

receive from the at least one GPU the composite color values for the pixels at which the text is to be displayed; and render, based on the composite color values, an anti-aliased version of the text to the display.

10. The apparatus of claim 9, wherein the at least one processor is programmed to configure the at least one GPU to determine the composite color values for the pixels at least in part by linearly combining color values for the text, as modified by the sub-pixel coverage values, and color values for at least one other display element that is to be displayed overlapping with the text on the display.

11. The apparatus of claim 10, wherein the at least one processor is programmed to configure the at least one GPU to determine the composite color values without performing a render-time gamma correction process.

12. The apparatus of claim 10, wherein the at least one other display element is a background graphic over which the text is to be superimposed on the display, and wherein the at least one processor is programmed to receive the request to render the text in response to a user animating the text on the display so as to move the text relative to the background graphic.

13. The apparatus of claim 9, wherein the at least one processor is programmed to configure the at least one GPU to determine a composite color value for a pixel of the display based at least in part on the sub-pixel coverage values for the pixel from the cache and on sub-pixel color values for the pixel from another source, the other source being arranged in accordance with a hardware organization from which the at least one GPU of the apparatus is natively configured to retrieve sub-pixel color values.

14. The apparatus of claim 13, wherein the at least one processor is further programmed to receive the request to render the text to the display, the request comprising the sub-pixel color values.

15. The apparatus of claim 13, wherein the at least one processor is further programmed to, in response to receiving the request, retrieve the sub-pixel color values.

16. At least one computer-readable storage medium encoded with computer-executable instructions that, when executed by a computer, cause the computer to carry out a method of processing text that will be displayed in a graphical interface of a computing device, the method comprising:

creating a mapping for the text, the mapping comprising information representing at least one shape of the text and corresponding to a plurality of sub-pixels of a display to be used in displaying the text;

calculating sub-pixel coverage values for the plurality of sub-pixels using a sub-pixel anti-aliasing technique; and caching, in a memory organized in a format that includes a red channel from which graphics processing unit (GPU) of the computing device is natively configured to retrieve red sub-pixel color values, a green channel from which the GPU of the computing device is natively configured to retrieve green sub-pixel color values, and a blue channel from which the GPU of the computing device is natively configured to retrieve blue sub-pixel color values, the sub-pixel coverage values for subsequent use in rendering the text in the graphical interface, wherein the caching includes caching the processed sub-pixel coverage values in at least one of the red channel, the blue channel, or the green channel.

17. The at least one computer-readable storage medium of claim 16, wherein calculating the sub-pixel coverage values comprises adjusting initial sub-pixel coverage values, output by the sub-pixel anti-aliasing technique, so as to compensate for nonlinearities of the display.

18. The at least one computer-readable storage medium of claim 17, wherein adjusting the initial sub-pixel coverage values so as to compensate for nonlinearities of the display comprises modifying the initial sub-pixel coverage values so as to enable composite color values for controlling the display to be calculated by linearly combining the initial sub-pixel coverage values and color values for the text with color values for at least one other display element that is to be displayed overlapping with the text.

19. The at least one computer-readable storage medium of claim 16, wherein caching the processed sub-pixel coverage values for the text comprises storing the processed sub-pixel coverage values in the memory without storing in the memory information on a color with which the text is to be displayed in the graphical interface.

20. The at least one computer-readable storage medium of claim 16, wherein caching the processed sub-pixel coverage values for the text comprises storing the processed sub-pixel coverage values in another memory for storing color values of display elements to be rendered, the other memory having an organization of values corresponding to a hardware organization of at least one GPU of the computer.

* * * * *